United States Patent
Davis et al.

(10) Patent No.: US 10,217,068 B1
(45) Date of Patent: Feb. 26, 2019

(54) SYSTEMS AND METHODS FOR PRE-SCHEDULING REPAIR OF HOME EQUIPMENT

(71) Applicant: STATE FARM MUTUAL AUTOMOBILE INSURANCE COMPANY, Bloomington, IL (US)

(72) Inventors: Justin Davis, Bloomington, IL (US); John Hailey, Bloomington, IL (US); Edward P. Matesevac, III, Normal, IL (US); Mark O'Flaherty, Champaign, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 287 days.

(21) Appl. No.: 14/822,436

(22) Filed: Aug. 10, 2015

(51) Int. Cl.
*G06Q 10/06* (2012.01)
*G06Q 10/00* (2012.01)
*G06Q 20/40* (2012.01)

(52) U.S. Cl.
CPC ....... *G06Q 10/06311* (2013.01); *G06Q 10/20* (2013.01); *G06Q 20/40* (2013.01)

(58) Field of Classification Search
CPC ................................................. G05B 23/0283
See application file for complete search history.

(56) References Cited

U.S. PATENT DOCUMENTS

| | | | |
|---|---|---|---|
| 6,552,647 B1 | 4/2003 | Thiessen et al. | |
| 6,842,776 B1 | 1/2005 | Poisner | |
| 7,664,667 B1 | 2/2010 | Ruppelt et al. | |
| 8,014,756 B1* | 9/2011 | Henderson | G06Q 10/103 455/411 |
| 8,095,403 B2 | 1/2012 | Price | |
| 8,410,931 B2 | 4/2013 | Petite et al. | |
| 8,527,306 B1 | 9/2013 | Reeser et al. | |
| 8,533,144 B1 | 9/2013 | Reeser et al. | |
| 8,892,263 B1 | 11/2014 | Morris et al. | |

(Continued)

OTHER PUBLICATIONS

Yu-Ping Tsou, Jun-Wei Hsieh, Cheng-Ting Lin, Chun-Yu Chen. "Building a Remote Supervisory Control Network System fo rSmart Home Applications." Published in 2006 IEEE International Conference on Systems, Man and Cybernetics. Oct. 8-11, 2006, Taipei, Taiwan. (Year: 2006).*

(Continued)

*Primary Examiner* — Peter H Choi
*Assistant Examiner* — Alissa D Karmis
(74) *Attorney, Agent, or Firm* — Marshall, Gerstein & Borun LLP; Randall G. Rueth

(57) ABSTRACT

A method and system may automatically detect failures and pre-schedule repairs for home equipment in a smart home environment when the property owner is away from the property. A smart home controller may receive sensor data from each of several pieces of home equipment to detect whether any failures have occurred. If the smart home controller detects a failure in one of the pieces of home equipment based on the sensor data, the smart home controller may communicate with a repair service provider to pre-schedule a repair of the piece of home equipment which experiences the failure. The repair service provider may then transmit a pre-scheduled time and cost for performing the repair and may perform the repair at the scheduled time.

20 Claims, 5 Drawing Sheets

(56) References Cited

U.S. PATENT DOCUMENTS

| | | | |
|---|---|---|---|
| 9,015,059 B2 | 4/2015 | Sims, III et al. | |
| 2002/0032491 A1* | 3/2002 | Imamura | D06F 39/005 700/79 |
| 2002/0128728 A1* | 9/2002 | Murakami | G05B 23/0245 700/10 |
| 2005/0224118 A1 | 10/2005 | Tornay | |
| 2007/0033087 A1 | 2/2007 | Combs et al. | |
| 2009/0271303 A1* | 10/2009 | Weng | G06Q 30/04 705/34 |
| 2010/0100259 A1 | 4/2010 | Geiter | |
| 2011/0074596 A1 | 3/2011 | Frohlick et al. | |
| 2012/0254345 A1 | 10/2012 | Montoya | |
| 2012/0310597 A1 | 12/2012 | Uchiyama et al. | |
| 2013/0159490 A1 | 6/2013 | Huh et al. | |
| 2013/0174586 A1* | 7/2013 | Kang | F25D 29/00 62/56 |
| 2014/0101058 A1* | 4/2014 | Castel | G06Q 10/20 705/305 |
| 2014/0172479 A1 | 6/2014 | Gallagher et al. | |
| 2014/0195184 A1 | 7/2014 | Maeda et al. | |
| 2014/0201072 A1 | 7/2014 | Reeser et al. | |
| 2014/0228061 A1 | 8/2014 | Draznin | |
| 2014/0232522 A1* | 8/2014 | Schmidt-Lackner | G07C 9/00126 340/5.28 |
| 2014/0250166 A1 | 9/2014 | Desai | |
| 2014/0266669 A1* | 9/2014 | Fadell | G05B 19/042 340/501 |
| 2014/0278248 A1* | 9/2014 | Whittle | G05B 23/0283 702/184 |
| 2015/0040591 A1 | 2/2015 | Lim et al. | |
| 2015/0089240 A1* | 3/2015 | Itkis | H04L 63/0861 713/186 |
| 2015/0156031 A1 | 6/2015 | Fadell et al. | |
| 2015/0234372 A1 | 8/2015 | Slupik et al. | |
| 2015/0262133 A1* | 9/2015 | Banchero | G06Q 10/20 705/305 |
| 2015/0339736 A1 | 11/2015 | Bennett | |
| 2015/0355649 A1* | 12/2015 | Ovadia | G05D 23/1917 704/233 |
| 2016/0205123 A1 | 7/2016 | Almurayh | |
| 2016/0301543 A1* | 10/2016 | Minezawa | G08C 17/02 |
| 2017/0344832 A1* | 11/2017 | Leung | G06K 9/00771 |

OTHER PUBLICATIONS

U.S. Appl. No. 14/822,330, filed Aug. 10, 2015.
U.S. Appl. No. 14/822,354, filed Aug. 10, 2015.
Office Action issued in U.S. Appl. No. 14/822,330 dated Jan. 8, 2016.
Office Action issued in U.S. Appl. No. 14/822,354 dated Dec. 11, 2015.
Office Action issued in U.S. Appl. No. 14/822,354 dated Apr. 26, 2016.
Office Action issued in U.S. Appl. No. 14/822,330 dated Jun. 23, 2016.
Office Action issued in U.S. Appl. No. 14/822,354 dated Jan. 12, 2017.
Office Action issued in U.S. Appl. No. 14/822,330 dated Mar. 10, 2017.
Office Action issued in U.S. Appl. No. 14/822,330 dated Sep. 11, 2017.
Office Action issued in U.S. Appl. No. 14/822,354 dated Jul. 14, 2017.
Office Action issued in U.S. Appl. No. 14/822,354 dated Dec. 28, 2017.
Office Action issued in U.S. Appl. No. 14/822,354 dated Apr. 2, 2018.

* cited by examiner

SYSTEMS AND METHODS FOR PRE-SCHEDULING REPAIR OF HOME EQUIPMENT

CROSS-REFERENCE TO RELATED APPLICATIONS

This application is related to the following applications: co-pending U.S. patent application Ser. No. 14/822,330, entitled "SYSTEMS AND METHODS FOR SCHEDULING REPAIR OF HOME EQUIPMENT" and filed concurrently herewith; and co-pending U.S. patent application Ser. No. 14/822,354, entitled "SYSTEMS AND METHODS FOR SENDING DIAGNOSTIC INFORMATION DURING SCHEDULING OF HOME EQUIPMENT REPAIR" and filed concurrently herewith, the entire disclosures of which are hereby expressly incorporated by reference.

TECHNICAL FIELD

The present disclosure generally relates to a method and system for pre-scheduling the repair of home equipment and, more particularly to a method and system for scheduling a repair service provider to repair a home appliance or other piece of home equipment upon detecting a failure in the piece of home equipment when a property owner is away.

BACKGROUND

Currently, many appliances and other goods are capable of communicating information about their operation via mesh networks as part of the "internet of things." Such appliances have started to incorporate digital "smart" functionalities including controls and sensors. Furthermore, it is possible for one or more central controllers to interface with the smart devices to facilitate automation and to receive information from the smart devices.

SUMMARY

To pre-schedule repair of home equipment, sensors and/or controls may be attached to home appliances and other pieces of home equipment within a property to capture information related to the current status of the piece of home equipment (also referred to herein as a "smart device"). For example, a refrigerator may include temperature sensors to detect the current temperature of the refrigerator, current sensors to detect the amount of electric current flowing to the refrigerator, speed sensors to detect the speed of the compressors in the refrigerator, fluid flow sensors to detect leaking refrigerant, etc.

Sensor data from each piece of home equipment within the property may be transmitted to a smart home controller associated with the property which may analyze the sensor data to determine whether a failure has occurred. For example, if the temperature of the refrigerator is above a predetermined threshold temperature (e.g., 45 degrees Fahrenheit), the smart home controller may determine that there is a likelihood of a failure. For clarity, the examples below refer to temperature in degrees Fahrenheit. However, this is merely for ease of illustration only, and temperature may be measured/received/set in degrees Celsius, degrees Kelvin, or any other suitable unit of temperature. In some embodiments, the smart home controller may analyze additional sensor data to determine whether the failure is caused by the piece of home equipment or as a result of an external failure (e.g., a power failure, the refrigerator has been left open for too long, etc.). When the smart home controller determines that the failure is caused by the piece of home equipment, the smart home controller may communicate with a repair service provider to schedule a repair.

For example, in some embodiments, the smart home controller may transmit a message to the repair service provider including identification information for the piece of home equipment (e.g., a model T1927 refrigerator), an indication of the failure which has occurred (e.g., the refrigerator temperature is above 45 degrees, leaking refrigerant, etc.), the location of the property, and a request for the repair service provider to provide a pre-scheduled time and cost for performing the repair. The message may also include authorization for the repair service provider to access the property and access information for accessing the property, such as an indication that a key to the front door will be under the door step, a security code for entering the garage or for entering through the front door, an alarm code for disabling a security alarm, etc.

The smart home controller may also receive a response notification from the repair service provider including a pre-scheduled time for performing the repair and a cost associated with the repair. In some embodiments, the property owner may pre-authorize payments for repairs up to a certain amount (e.g., $1000). If the cost is less than or equal to the pre-authorized amount the smart home controller may pre-pay the repair service provider, and in turn, the repair service provider may enter the property at the pre-scheduled time to perform the repair.

In this manner, home equipment repairs may automatically be scheduled, before a property owner recognizes a failure and decides that the piece of home equipment needs to be repaired. The property owner may not have to be involved in the repair process at all. By pre-authorizing repair service providers to enter the property for repairs which cost up to a certain amount, home equipment failures may be detected and repaired without any involvement from the property owner. Moreover, while a property owner is likely to detect false positives (that the piece of home equipment needs to be repaired when in fact it does not) and to detect false negatives (that the failure in the piece of home equipment can be resolved without repair when in fact the piece of home equipment does require repair), the smart home controller may accurately determine whether a repair is necessary.

In an embodiment, a computer-implemented method for automatically pre-scheduling repair of home equipment is provided. For each of one or more pieces of home equipment located at a property which includes a smart home system, the method includes receiving sensor data for the piece of home equipment generated by one or more sensors communicatively coupled to the piece of home equipment, and determining whether the piece of home equipment needs to be repaired based on the received sensor data. When the piece of home equipment needs to be repaired, the method further includes transmitting a first notification to a repair service provider for pre-scheduling a repair of the piece of home equipment for when an owner of the property will be away from the property, wherein the first notification includes an authorization to access the property and access information for accessing the property, and receiving a second notification from the repair service provider including a pre-scheduled time for repairing the piece of home equipment.

In another embodiment, a system for automatically pre-scheduling repair of home equipment is provided. The system includes one or more processors, one or more sensors communicatively coupled to one or more pieces of home equipment located at a property which includes a smart home system, a communication network, and a non-transitory computer-readable memory coupled to the one or more processors, the one or more sensors, and the communication network and storing instructions thereon. When executed by the one or more processors, the instructions cause the system to for each of the one or more pieces of home equipment, receive sensor data for the piece of home equipment generated by at least some of the one or more sensors which are communicatively coupled to the piece of home equipment, and determine whether the piece of home equipment needs to be repaired based on the received sensor data. When the piece of home equipment needs to be repaired, the instructions cause the system to transmit, via the communication network, a first notification to a repair service provider for pre-scheduling a repair of the piece of home equipment for when an owner of the property will be away from the property, wherein the first notification includes an authorization to access the property and access information for accessing the property, and receive, via the communication network, a second notification from the repair service provider including a pre-scheduled time for repairing the piece of home equipment.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
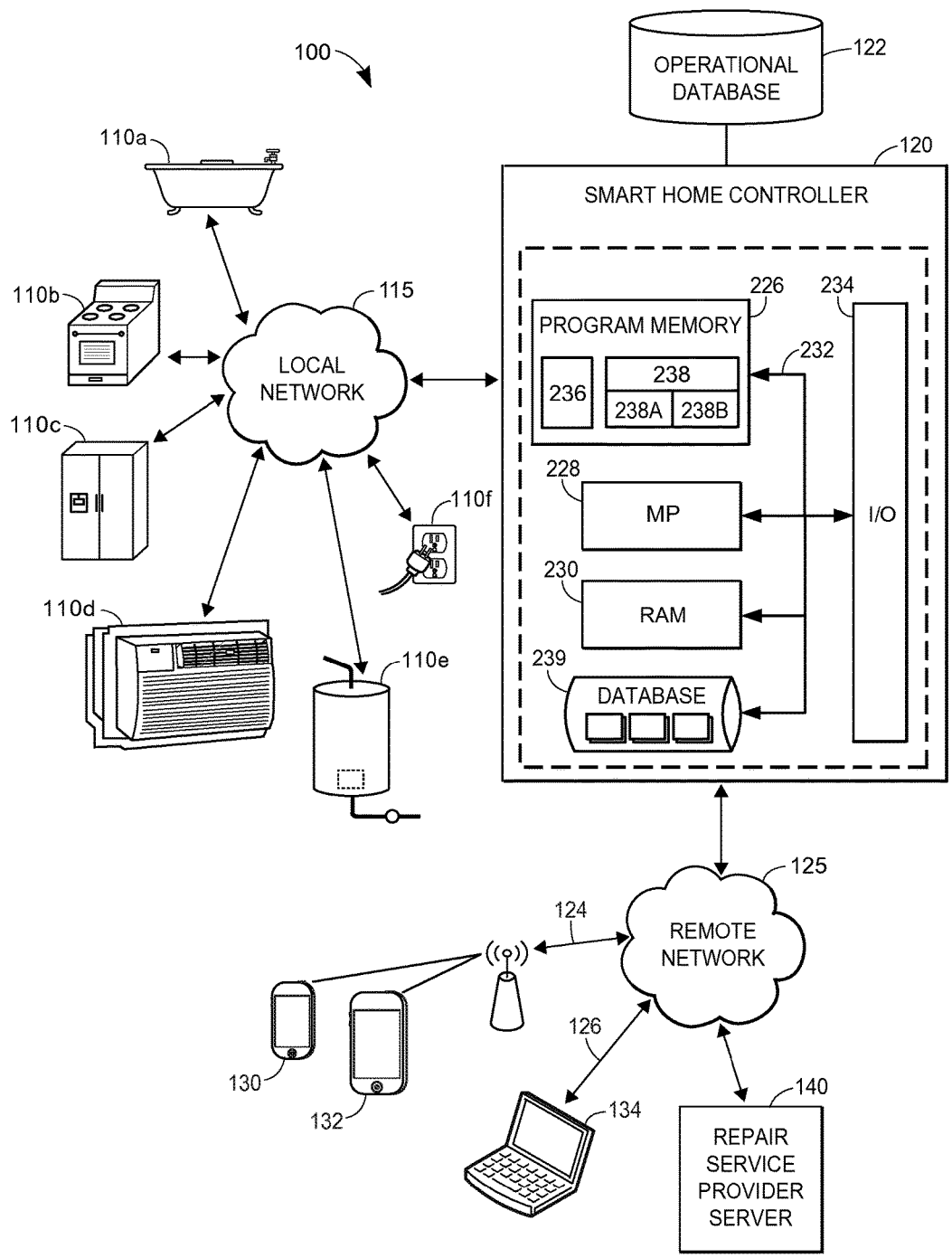
FIG. 1 depicts a block diagram of an example system in which techniques for pre-scheduling repair of home equipment are implemented.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, the term "smart" as used herein, may refer to devices, sensors or appliances located inside or proximate to a property with the ability to remotely communicate information about the status of the device, sensor, or appliance and/or receive instructions that control the operation of the device, sensor, or appliance. For example, a smart thermostat may be able to remotely communicate the current temperature of the home and receive instructions to adjust the temperature to a new level. As another example, a smart water tank may be able to remotely communicate the water level contained therein and receive instructions to restrict the flow of water leaving the tank.

A "smart device" shall be used herein to refer to any of a smart device, sensor, appliance, and/or other smart piece of home equipment that may be disposed on or proximate to a property. In embodiments in which an appliance and a sensor external to the particular appliance are associated with each other, "smart device" may refer to both the external sensors and the appliance collectively. Some examples of devices that may be "smart devices" are, without limitation, valves, piping, clothes washers/dryers, dish washers, refrigerators, freezers, sprinkler systems, toilets, showers, sinks, soil monitors, doors, locks, windows, shutters, ovens, grills, fire places, furnaces, lighting, sump pumps, security cameras, and alarm systems. Some examples of external sensors that may be associated with an appliance are, without limitation, voltage sensors, current sensors, resistance sensors, flow rate sensors, pressure sensors, temperature sensors, proximity sensors, level sensors, speed sensors, image sensors, and audio sensors.

A "failure" in a piece of home equipment or "home equipment failure" may be used herein to refer to any type of damage to the piece of home equipment which may render the piece of home equipment inoperable or unsatisfactory in performing its intended functions and/or may create a safety risk to those on the property. For example, damage to a piece of home equipment which requires replacement of one of its parts may be a home equipment failure. In another example, a home equipment failure may occur when an air conditioning unit designed to cool down a room is unable to sufficiently reduce the temperature in the room.

The term "repair service provider" as used herein, generally refers to a party and/or entity (e.g., a business and/or other organizational entity) that provides repair services for a customer, e.g., by going to a customer's home and repairing various pieces of home equipment, such as heating, ventilating, and air conditioning (HVAC) units, clothes washers, dryers, dish washers, refrigerators, freezers, toilets, showers, sinks, sump pumps, stoves, ovens, grills, microwaves, electrical outlets, lighting, etc. Further, a repair service provider may be any individual, group of individuals, company, corporation, and/or other type of entity that may perform repair service for customers.

As used herein, the term "property owner" may be used to refer to any individual associated with the property. The individual may be a family member of the property owner, a person renting/subletting the property, a person living or working on the property, or any other individual that may have an interest in fixing damage to the property.

Further, any reference to "home" is meant to be exemplary and not limiting. The systems and methods described herein may be applied to any property, such as offices, farms, lots, parks, and/or other types of properties or buildings. Accordingly, "homeowner" may be used interchangeably with "property owner." As used herein, "property" may also refer to any buildings, belongings and/or equipment disposed on the property itself.

A home may have a "smart" central controller (referred to as a "smart home controller" herein) and be wirelessly interconnected, or even hard-wired, with various household related items and/or sensors. Despite being referred to as the "smart home controller," the central controller may be associated with any type of property, such as offices, restaurants, farms, and/or other types of properties. The smart home controller may be in wireless or wired communication with various smart appliances (e.g., clothes washer, dryer, dish washer, refrigerator, etc.), smart heating devices (e.g., furnace, space heaters, etc.), smart cooling devices (e.g., air conditioning units, fans, ceiling fans, etc.), smart plumbing fixtures (e.g., toilets, showers, water heaters, piping, interior and yard sprinklers, etc.), smart cooking devices (e.g., stoves, ovens, grills, microwaves, etc.), smart wiring, lighting, and lamps, smart thermostats, smart windows, doors, or garage doors, smart window blinds or shutters, smart electrical outlets, and/or other smart pieces of home equipment and/or sensors capable of wireless or wired communication. Each smart piece of home equipment (or smart sensor), as well as the smart home controller, may be equipped with a processor, memory unit, software applications, wireless transceivers, local power supply, various types of sensors, and/or other components.

The smart home controller may remotely gather data from the smart pieces of home equipment (or smart sensors) dispersed around or otherwise interconnected within the property. The smart home controller may further detect that various equipment may have failed or is about to fail. The smart home controller may analyze energy usage associated with the equipment; the amount of time that the equipment has been in use; the number of times that the equipment has cycled on and off; e-signatures of motors or circuit boards that control equipment (such as furnaces, air conditioners, or other equipment); vibration of, or noise created by, motors or pumps, maintenance records; and/or other sources of information. The smart home controller may shut down equipment identified as faulty, questionable, or in need of maintenance or repair; limit the operation of such equipment; issue a related notification or other message to the property owner and/or repair service provider; and/or take other corrective actions.

The present aspects may advantageously allow for efficient and accurate detection/repair of home equipment failures within a smart home environment. For example, the repair pre-scheduling system may accurately detect the occurrence of a home equipment failure, and/or may transmit a likely cause of the failure to the repair service provider. This may save the repair service provider time in locating the cause of the failure, thereby reducing costs for performing the repair.

Moreover, whereas a property owner and/or repair service provider may have to use various measuring instruments (e.g., a multimeter, an ohmmeter, an oscilloscope, a flow meter, etc.) and may have to take the piece of home equipment apart to detect the occurrence/cause of a failure, the repair pre-scheduling system advantageously may detect failures directly from the piece of home equipment during operation via the sensors. Furthermore, while repair service providers may be trained to detect home equipment failures based on a set of characteristics discussed in their training, the repair pre-scheduling system may continue to learn new sets of characteristics from previous sensor data received at the smart home controller or from sensor data received at other properties also having smart home controllers.

Generally speaking, techniques for pre-scheduling repair of home equipment may be implemented in a smart home controller, one or more pieces of home equipment (smart devices), a client device, a repair service provider server, or a system that includes a combination of these devices. However, for clarity, the examples below focus primarily on an embodiment in which a smart home controller receives sensor data from one or more pieces of home equipment. If the smart home controller detects a failure in one of the pieces of home equipment, the smart home controller may communicate with a repair service provider server to pre-schedule a time for a repair technician to fix the piece of home equipment experiencing the failure. The smart home controller may also provide information for accessing the property to the repair service provider server, such as a garage door security code, the location of a front door key, an alarm code for disabling a home security alarm, etc. Moreover, the smart home controller may also transmit pre-payment up to a pre-authorized amount to the repair service provider server corresponding to the cost of performing the repair.

FIG. 1 depicts an exemplary environment 100 associated with detecting failures and pre-scheduling repairs of equipment within a home. Although FIG. 1 depicts certain entities, components, and devices, it should be appreciated that additional or alternate entities and components are envisioned.

As illustrated in FIG. 1, the environment 100 may include a plurality of smart devices 110 that may be each connected to a local communication network 115. As shown in FIG. 1, the plurality of smart devices 110 may include a smart bathtub 110a, a smart oven 110b, a smart refrigerator 110c, a smart air conditioning unit 110d, a smart water supply 110e, and/or a smart electrical outlet 110f. Although FIG. 1 depicts six smart devices in the environment 100, it should be appreciated that additional or fewer smart devices may be present in other embodiments. In some cases, the smart devices may be purchased from the manufacturer with the "smart" functionally incorporated therein. In other cases, the smart devices may have been purchased as "dumb" devices and subsequently modified to add the "smart" functionality to the device. For example, a homeowner may install a motor system on window shutters that is capable of transmitting the open/close status of the shutters and remotely receiving instructions to open or close the shutters.

The plurality of smart devices 110 may be configured to communicate with a smart home controller 120 via the local communication network 115. The local network 115 may facilitate any type of data communication between devices and controllers located on or proximate to the property via any standard or technology (e.g., Bluetooth®, RFID, X10, UPnP®, IEEE 802 including Ethernet, GSM, CDMA, LTE, and/or others). According to present embodiments, the plurality of smart devices 110 may transmit, to the smart home controller 120 via the local network 115, operational data gathered from sensors associated with the plurality of smart devices 110. The operational data may be audio data, image or video data, or status data. For example, the operational data may indicate the flow rate of water through a pipe, the amount of energy consumed by the smart device, the on/off status of a smart device, the sound a smart device makes, and/or other information pertinent to determining the presence of a failure.

The smart home controller 120 may analyze the received operational data and transmit, via the local network 115, instructions or commands to the plurality of smart devices 110. As an example, the smart home controller 120 may determine that the gas flow to the smart oven 110b is above a certain threshold, even when the operational data from smart oven 110b indicates that smart oven 110b is turned off. As a result, the smart home controller 120 may determine that there is a gas leak in either the gas pipes leading to the smart oven 110b or in smart oven 110b itself. The smart home controller 120 may also determine that the gas leak is likely caused by a hole in section D of the gas pipe by analyzing the operational data.

The smart home controller 120 may include a program memory 226, a microcontroller or a microprocessor (MP) 228, a random-access memory (RAM) 230, and/or an input/output (I/O) circuit 234, all of which may be interconnected via an address/data bus 232. In some embodiments, the smart home controller 120 may also include, or otherwise be communicatively connected to, a database 239 or other data storage mechanism (e.g., one or more hard disk drives, optical storage drives, solid state storage devices, etc.). The database 239 may include data such as property owner contact information, repair service provider information, application screens, web page templates and/or web pages, and other data necessary to interact with property owners, and/or repair service providers through the remote network 125.

It should be appreciated that although FIG. 1 depicts only one microprocessor 228, the smart home controller 120 may include multiple microprocessors 228. Similarly, the memory of the smart home controller 12 may include multiple RAMs 230 and/or multiple program memories 226. Although FIG. 1 depicts the I/O circuit 234 as a single block, the I/O circuit 234 may include a number of different types of I/O circuits. The smart home controller 120 may implement the RAM(s) 230 and/or the program memories 226 as semiconductor memories, magnetically readable memories, and/or optically readable memories, for example.

As shown in FIG. 1, the program memory 226 and/or the RAM 230 may store various applications for execution by the microprocessor 228. For example, a user-interface application 236 may provide a user interface to the smart home controller 120, which user interface may, for example, allow the property owner to pre-authorize automatic scheduling of home equipment repairs including authorizing repair service providers to access the property and authorizing payment for the cost of repairs up to a maximum amount, view notifications detailing the failure of a piece of home equipment, or view the current status of a piece of equipment. A repair scheduling application 238 may operate to identify failures in the smart devices, and to transmit a notification to the repair service provider to schedule repair of the smart devices. The repair scheduling application 238 may be a single module 238 or a plurality of modules 238A, 238B.

While the repair scheduling application 238 is depicted in FIG. 1 as including two modules, 238A and 238B, the repair scheduling application 238 may include any number of modules accomplishing tasks related to implementation of the smart home controller 120.

According to present embodiments, the smart home controller 120 may be coupled to a database 122 that stores past operational data associated with the plurality of smart devices 110 or otherwise associated with "normal" operating characteristics of the plurality of smart devices 110. In some embodiments, the database 122 may organize the past operational data according to which individual smart device the data is associated. The smart home controller 120 may analyze the operational data to develop a baseline model for normal operation of the plurality of smart devices 110. When new operational data is received, the smart home controller 120 may store the new data in the database 122 and then compare the new operational data to the baseline model in order to determine variations from normal operation indicative of an equipment failure.

Returning to the gas oven example, the average rate of gas flowing through a pipe to the smart oven 110b may exceed the rate in the normal operation model for a given duration and/or time of day. The smart home controller 120 may determine that this difference between the operational data and the baseline model indicates that there is a potential gas leak associated with smart oven 110b which may be indicative of a failure. Although FIG. 1 depicts the database 122 as coupled to the smart home controller 120, it is envisioned that the database 122 may be maintained in the "cloud" such that any element of the environment 100 capable of communicating over either the local network 115 or a remote network 125 may directly interact with database 122.

The smart home controller 120 may also be in communication with one or more client devices 130-134 associated with the property owner via the remote network 125. The client devices 130-134 associated with the property owner may include a smartphone (also referred to herein as a "mobile device") 130, a tablet 132, a laptop 134, a desktop, a smart watch, smart glasses, phablet, smart contact lenses, wearable electronics, pager, personal digital assistant, computing device configured for wireless communication, or any other electronic device. The remote network 125 may facilitate any data communication between the smart home controller 120 located on the property and entities or individuals remote to the property via any standard or technology (e.g., GSM, CDMA, TDMA, WCDMA, LTE, EDGE, OFDM, GPRS, EV-DO, UWB, IEEE 802 including Ethernet, WiMAX, and/or others). In some cases, both the local network 115 and the remote network 125 may utilize the same technology. Although FIG. 1 depicts the smart home controller 120 and the client devices 130-134 in communication via the remote network 125, there are embodiments in which the client devices 130-134 are on the property and in communication with the smart home controller 120 via the local network 115.

In some embodiments, when the smart home controller 120 determines that a failure has occurred in one of the pieces of home equipment, the smart home controller 120 may send a property owner notification describing the failure to the one of the client devices 130-134 via the remote network 125. The property owner notification may include, an indication of the smart device experiencing the failure, a graphic depiction of the smart device and/or of the failure, an indication of a likely cause of the failure, etc. In some embodiments, the property owner notification may include an indication that the smart home controller has contacted a repair service provider to repair the smart device.

The smart home controller 120 may also be in communication with a repair service provider server 140 via the remote network 125. According to present embodiments, the repair service provider server 140 may include one or more hardware server(s) configured to facilitate the functionalities described herein. In some embodiments, the smart home controller 120 may communicate with several repair service provider servers 140 to select the best repair service provider for the type of repair. For example, the smart home controller 120 may communicate with a first repair service provider when a refrigerator experiences a failure, a second repair service provider when an oven experiences a failure, and a third repair service provider when a plumbing fixture such as a bathroom sink experiences a failure. In some embodiments, the property owner may pre-authorize some repair service providers to perform repairs, and the smart home controller 120 may communicate with a network of the pre-authorized repair service providers. For example, the pre-authorized repair service providers may include repair service providers which the property owner trusts/authorizes to receive access information to the property.

The smart home controller 120 may obtain contact information for each repair service provider, for example via the databases 122, 239 or by searching the Internet for repair service providers. Moreover, the smart home controller 120 may determine which repair service provider to communicate with based on a set of rules stored in the databases 122, 239, based on user preferences stored in the databases 122, 239, or by searching the Internet for reviews of repair service providers.

In any event, the smart home controller 120 may transmit a notification detailing the failure to the repair service provider server 140 including identification information for the smart device experiencing the failure, an indication of a likely cause of the failure, a location of the property which includes the piece of home equipment, a request to provide a pre-scheduled time and cost for the repair service provider to perform the repair, an authorization for the repair service provider to access the property, access information for accessing the property, etc. It will be appreciated that although only one smart home controller 120 is depicted in FIG. 1, multiple smart home controllers 120 may be provided for the purpose of distributing server load, serving different web pages, etc.

Figure 2:
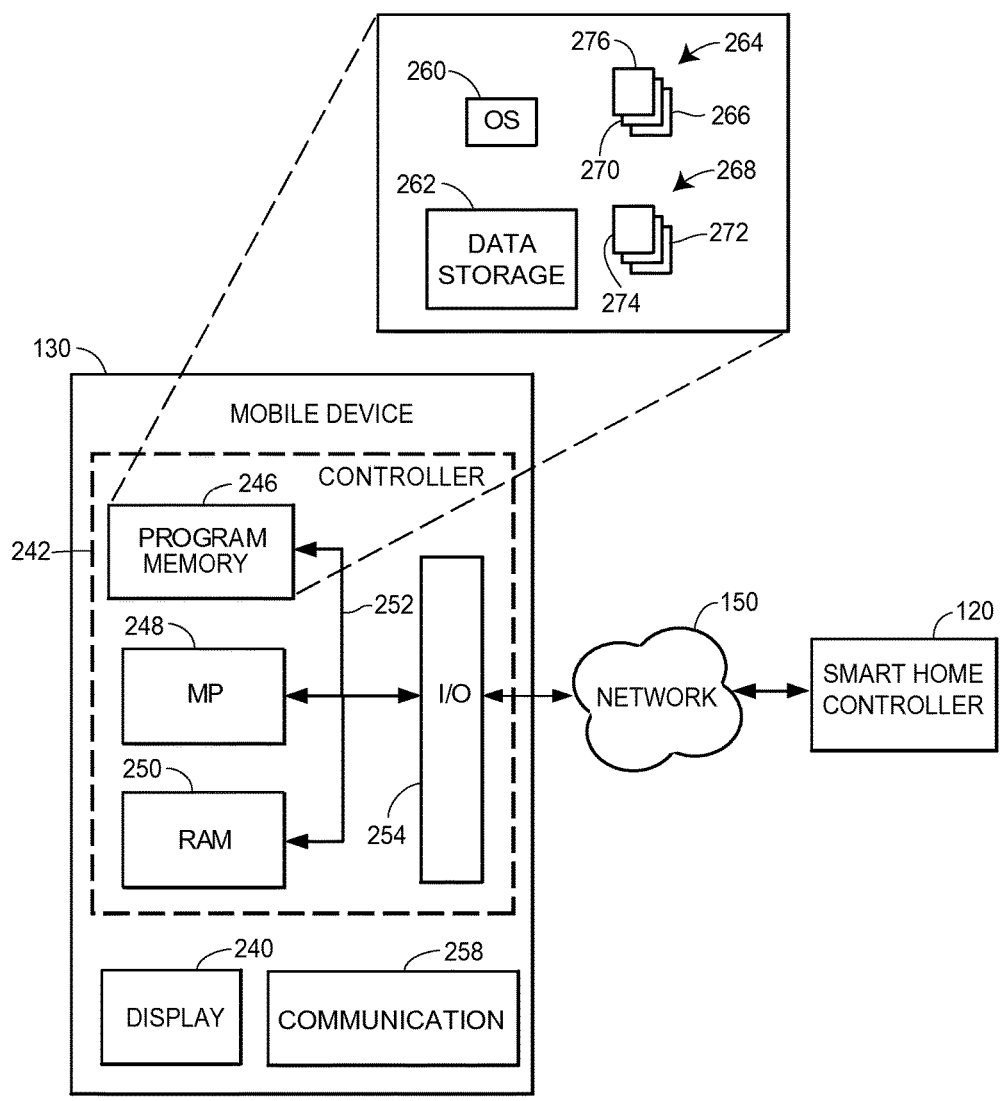
FIG. 2 depicts a block diagram of an exemplary client device.

Referring now to FIG. 2, the mobile device 130 (or any of the client devices 130-134) may include a display 240, a communication unit 258, a user-input device (not shown), and a controller 242. Similar to the smart home controller 120, the controller 242 may include a program memory 246, a microcontroller or a microprocessor (MP) 248, a random-access memory (RAM) 250, and/or an input/output (I/O) circuit 254, all of which are interconnected via an address/data bus 252. The program memory 246 may include an operating system 260, a data storage 262, a plurality of software applications 264, and/or a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

The data storage 262 may include data such as user profiles, application data for the plurality of applications 264, routine data for the plurality of routines 268, and/or other data necessary to interact with the smart home controller 120 through the remote network 125. In some embodiments, the controller 242 may also include, or otherwise be communicatively connected to, other data storage mechanisms (e.g., one or more hard disk drives, optical storage drives, solid state storage devices, etc.) that reside within the mobile device 130.

The communication unit 258 may communicate with the smart home controller 120 via any suitable wireless communication protocol network, such as a wireless telephony network (e.g., GSM, CDMA, LTE, etc.), a Wi-Fi network (802.11 standards), a WiMAX network, a Bluetooth network, etc. The user-input device (not shown) may include a "soft" keyboard that is displayed on the display 240 of the mobile device 130, an external hardware keyboard communicating via a wired and/or a wireless connection (e.g., a Bluetooth keyboard), an external mouse, and/or any other suitable user-input device.

As discussed with reference to the smart home controller 120, it should be appreciated that although FIG. 2 depicts only one microprocessor 248, the controller 242 may include multiple microprocessors 248. Similarly, the memory of the controller 242 may include multiple RAMs 250 and/or multiple program memories 246. Although FIG. 2 depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and/or configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the mobile device 130.

One of the plurality of applications 264 may be a native application and/or web browser 270, such as Apple's Safari®, Google Android™ mobile web browser, Microsoft Internet Explorer® for Mobile, Opera Mobile™, that may be implemented as a series of machine-readable instructions for receiving, interpreting, and/or displaying application screens or web page information from the smart home controller 120 while also receiving inputs from the user. Another application of the plurality of applications may include an embedded web browser 276 that may be implemented as a series of machine-readable instructions for receiving, interpreting, and/or displaying web page information. One of the plurality of routines may include a pre-authorization routine 272 that may allow the property owner to pre-authorize automatic scheduling of home equipment repairs for selected repair service providers and/or for any repair service provider, may allow the property owner to pre-authorize repair service providers to access the property, and may allow the property owner to pre-authorize payment for the cost of repairs up to a maximum payment amount. Another routine in the plurality of routines may include a payment adjustment routine 274 that may allow the property owner to receive and respond to requests to increase the pre-authorized payment amount to an amount corresponding to a received cost, when the received cost is greater than the current pre-authorized payment amount.

Preferably, a property owner and/or a user may launch the client application 266 from a client device, such as one of the client devices 130-134, to communicate with the smart home controller 120 to implement the repair pre-scheduling system. Additionally, the property owner and/or the user may also launch or instantiate any other suitable user interface application (e.g., the native application or web browser 270, and/or any other one of the plurality of software applications 264) to access the smart home controller 120 to realize the repair pre-scheduling system.

As used herein, the term "property owner" indicates any individual associated with the property, such as a person who owns the property, a family member of the person who owns the property, a person renting/subletting the property, a person living or working on the property, or any other individual that may have an interest in fixing damage to the property. Generally, the term "user" is used when referring to a person who is operating one of the client devices 130-134 and is not exclusive of the term "property owner."

Figure 3:
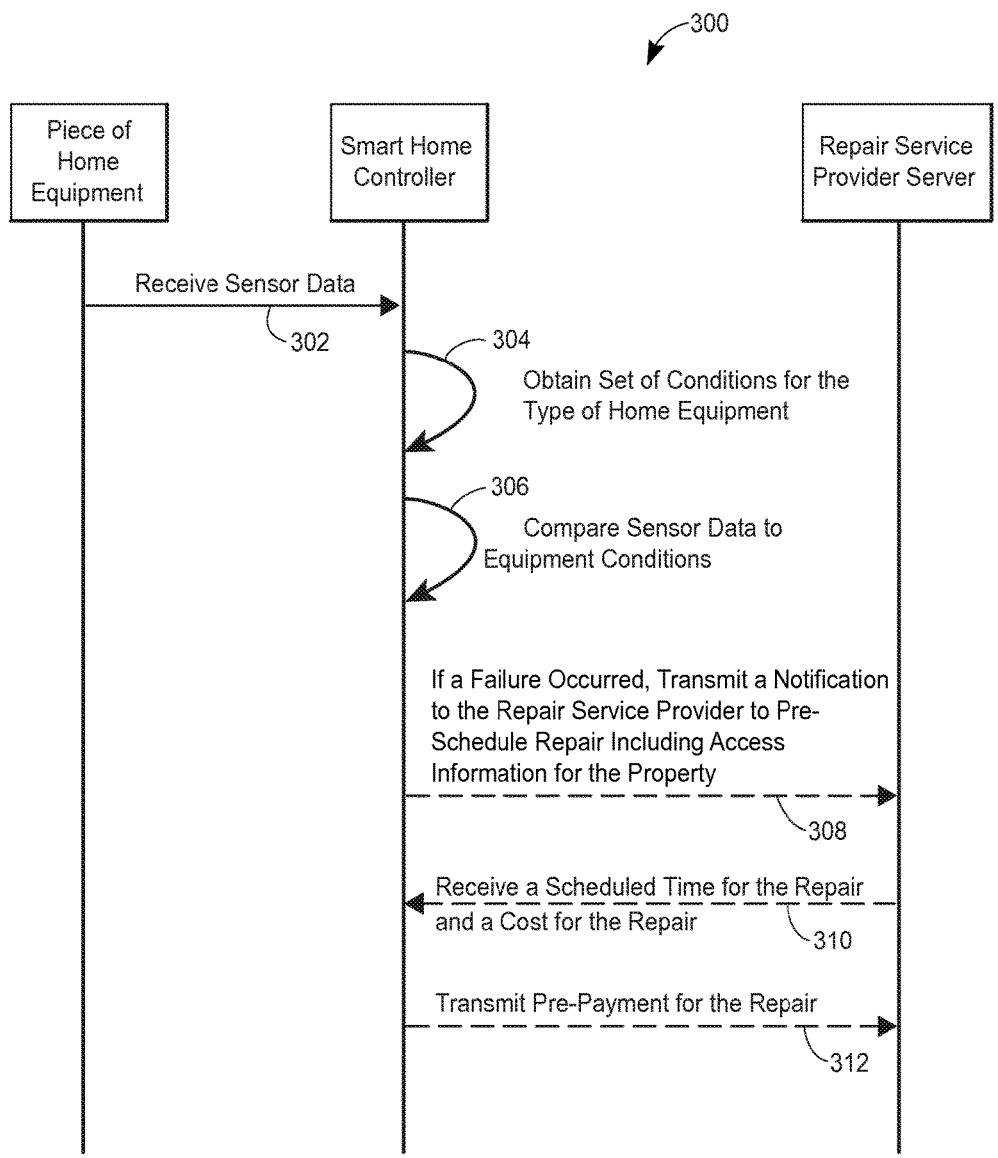
FIG. 3 depicts an exemplary interaction between a piece of home equipment, a smart home controller, and a repair service provider in accordance with the presently described embodiments.

As mentioned above, to detect a failure in a piece of home equipment and schedule a repair, the smart home controller 120 may communicate with the pieces of home equipment such as the smart device 110a-f and a repair service provider, for example via a repair service provider server 140. FIG. 3 depicts an exemplary interaction 300 between the smart home controller 120, a piece of home equipment such as one of the smart devices 110a-f, and a repair service provider server 140. Although FIG. 3 depicts a single piece of home equipment, the smart home controller 120 may be in communication with any number of pieces of home equipment on the property.

Before the interaction illustrated in FIG. 3 begins, the property owner may pre-authorize the repair pre-scheduling system including the smart home controller to automatically schedule home equipment repairs and provide access to the property. In some embodiments, the smart home controller may transmit an authorization screen (not shown) to one of the client devices 130-134 with text including the terms of the authorization. The smart home controller may also display the authorization screen on the smart home controller via the user interface application 236 as shown in FIG. 1. The authorization screen (not shown) may also include user controls for signing, initialing, or agreeing to the terms of the authorization in any other suitable manner. Once, the property owner pre-authorizes the repair pre-scheduling system to automatically schedule home equipment repairs, the smart home controller may detect a failure in a piece of home equipment, schedule a time for a repair service provider to repair the piece of home equipment, provide access to the property to the repair service provider, and transfer payment to the repair service provider (up to a pre-authorized amount) without communicating with the property owner.

The authorization may include one or more specified repair service providers which may perform the repairs. In some scenarios, the property owner may not select repair service providers and the authorization may be for any repair service provider selected by the smart home controller to perform the repair. Additionally, the authorization may include an authorization for the specified or unspecified repair service providers to access the property and information explaining how the repair service providers may access the property. For example, the property owner may specify a location where a key to the front door may be placed, such as underneath the welcome mat or in a flowerpot next to the doorstep. In another example, the property owner may provide a security code for opening the front door or a garage door, the property owner may provide an alarm code for disabling a home security alarm, and/or the property owner may provide any other suitable information which may be used to access the property.

Moreover, the authorization may also include a maximum payment amount (e.g., $1000) which the smart home controller is authorized to pay the repair service provider for performing the repair. In some embodiments, if the repair service provider charges more than the pre-authorized payment amount, the smart home controller may transmit a request to one of the client devices 130-134 for the property owner to authorize payment at the additional cost. The property owner may then transmit authorization to the smart home controller to increase the pre-authorized payment amount to the amount corresponding to the received cost, and as a result, the smart home controller may transmit a pre-payment to the repair service provider. In other embodiments, if the repair service provider charges more than the pre-authorized payment amount, the smart home controller may transmit another notification to the repair service provider not to perform the repair, and may select a different repair service provider. Furthermore, the authorization may also include an authorization and information for accessing a payment exchange account owned by the property owner to pay the repair service provider for performing the repair. For example, the property owner may provide access to a Venmo®, Google Wallet™, PayPal™, or Apple Pay™ account, so that the smart home controller may transfer payment to the repair service provider up to the pre-authorized payment amount.

Also, in some embodiments, the smart home controller may transmit a pre-payment to the repair service provider for the cost of the repair up to the pre-authorized payment amount, before the repair service provider performs the repair. Moreover, the smart home controller may also transmit a pre-payment to the repair service provider for a portion of the cost of the repair before the repair service provider performs the repair, and may transmit another payment to the repair service provider for the rest of the cost of the repair after the repair service provider performs the repair. In yet other embodiments, payment and/or pre-payment may be transmitted/divided in any other suitable manner.

Further, in some embodiments, the specified or unspecified repair service providers who may be selected for performing home equipment repairs may also have to agree to certain terms to be selected for performing the repairs, such as to provide fair cost assessments for the repairs, to charge a predetermined amount based on the type of repair, to be liable for any damages to the property while the repair service provider or an agent of the repair service provider (e.g., a repair technician) is on the property, not to disclose the provided access information to the property, etc.

In any event, when the property owner pre-authorizes automatic scheduling of home equipment repairs, the smart home controller may receive sensor data from the piece of home equipment (reference 302), periodically (e.g., every ten seconds) and/or in response to a trigger event (e.g., when the piece of home equipment is powered on). The sensor data may include information pertaining to the operation of the piece of home equipment, such as audio data, visual data, and data regarding the status of any characteristic of the operation of the piece of home equipment. For example, if the piece of home equipment is a smart oven, such as the smart oven 110b as shown in FIG. 1, the sensor data may include the current temperature of the oven, the temperature setting for the oven, the amount of electrical current supplied to the oven, the amount of electrical resistance present in the bake element of the oven, the amount of electrical resistance present in the broil element of the oven, the amount of electrical resistance present in the oven igniter, a voltage waveform indicating the amount of voltage supplied to the bake and broil elements of the oven, images of the bake and broil elements, the gas flow supplied to the oven, etc.

Additionally, the smart home controller may obtain a set of equipment conditions which, when satisfied, may be indicative of a failure of the piece of home equipment (reference 304). The equipment conditions may be specific to a type of home equipment (e.g., the set of equipment conditions which may indicate a failure for a refrigerator may be different than the set of equipment conditions which may indicate a failure for a stove). Moreover, the equipment conditions may include a baseline model for normal operational behavior for the type of home equipment, and may include a threshold variance from the normal operational behavior, which after accounting for external factors and/or the status of the piece of home equipment (e.g., whether the piece of home equipment is turned on, whether the property is experiencing a power failure, the indoor/outdoor temperature, etc.), may be indicative of a failure.

An equipment condition may be satisfied when the sensor data differs from at least some of the data included in the equipment condition. For example, an equipment condition may be satisfied when the sensor data differs from the normal operating characteristics, when the sensor data differs from the normal operating characteristics by more than a threshold variance, when the sensor data is above the normal operating characteristics, when the sensor data is below the normal operating characteristics, when the sensor data is above the normal operating characteristics by more than the threshold variance, when the sensor data is below the normal operating characteristics by more than the threshold variance, or in any other suitable manner.

In some embodiments, one or several of the equipment conditions may correspond to a particular part within the piece of home equipment. If the equipment condition is satisfied, the smart home controller may determine that the corresponding part needs to be repaired or replaced. The smart home controller may then transmit diagnostic information including an indication that the corresponding part needs to be repaired or replaced to the repair service provider, as described in more detail below. For example, an equipment condition corresponding to the bake element of the smart oven may be: the resistance in a bake element of the smart oven differs by more than a threshold variance, 1000 ohms, from a normal operating resistance, 2500 ohms. If the smart home controller receives a resistance in the bake element of less than 1500 ohms or more than 3500 ohms, the smart home controller may determine that the bake element needs to be repaired or replaced.

In some embodiments, the smart home controller may obtain additional replacement rules for determining whether a part within a piece of home equipment needs to be repaired or whether the part needs to be replaced. For example, if the resistance in the bake element of a smart oven is too high or too low, the bake element may need to be replaced, whereas if a gas leak is detected in a pipe for a smart stove, the pipe may be repaired, for example, by replacing the section of the pipe causing the leak, by patching up the leak, or by insulating the pipe. The additional rules may be obtained from the manufacturer of the piece of home equipment or of the part, from one or several repair service providers, may be set by the user, may be learned based on diagnostic information from previous failures or from pieces of home equipment on other properties, or may be obtained in any suitable manner. Moreover, the additional replacement rules may be generated based on the type of the part (e.g., a bake element, a motor, a pipe, etc.), the type of home equipment (e.g., an oven, a stove, a refrigerator, an electrical outlet, etc.), the sensor data associated with the part, the equipment condition corresponding to the part, or based on any other suitable factor.

If the smart home controller determines that a particular part needs to be repaired or replaced based on the equipment conditions, the smart home controller may then obtain the additional replacement rules to determine whether the part may be repaired or whether the part needs to be replaced. If the smart home controller determines that the part needs to be replaced, a notification including identification information for a replacement part may be transmitted to a repair service provider for scheduling repair of the piece of home equipment. On the other hand, if the smart home controller determines that the part may be repaired, instructions on how to repair the part may be included in the notification to the repair service provider.

In any event, the set of equipment conditions may be obtained from the operational database 122, may be received from other smart home controllers, may be learned based on previous sensor data, may be obtained from the manufacturer of the piece of home equipment, may be configured by a user, or may be obtained in any other suitable manner. For example, in some embodiments, the smart home controller may obtain sets of sensor data from the smart devices and sets of sensor data from smart devices at other properties which are not associated with the smart home controller. The sets of sensor data may be obtained along with indications of whether each set of sensor data is associated with a failure in the corresponding piece of home equipment. For each type of home equipment, the smart home controller may adjust or learn a set of equipment conditions which may be indicative of a failure, based on the sensor data for the particular type of home equipment which is associated with a failure and the sensor data for the particular type of home equipment which is not associated with a failure.

For example, the smart home controller may obtain an equipment condition for a refrigerator from the operational database 122, which may include a normal operating temperature of 35 degrees with a threshold variance of 5 degrees when the refrigerator is running. The smart home controller may also obtain refrigerator temperatures from the smart refrigerator 110c and from refrigerators at other properties along with indications of whether each of these temperatures is associated with a refrigerator failure. Based on the obtained temperature data, the smart home controller may adjust the normal operating refrigerator temperature to 37 degrees with a threshold variance of 3 degrees.

The smart home controller may then compare the received sensor data to the set of equipment conditions corresponding to the same type of equipment as the piece of home equipment (reference 306). If one or more of the set of equipment conditions is satisfied, the smart home controller may determine that a failure has occurred in the piece of home equipment. For example, if the temperature in the oven (e.g., 200 degrees) as detected by the sensors, is less than the normal operating temperature (e.g., 400 degrees) by more than the threshold variance (e.g., 25 degrees) when taking into account external factors and the current status of the oven, such as the current temperature setting for the oven (e.g., 400 degrees), whether the oven has been turned on and/or is plugged in, whether there has been sufficient time to preheat the oven to the desired temperature setting (e.g., 10 minutes), etc., the smart home controller may determine that a failure has occurred in the oven.

Other examples of normal operational behavior may include an amount of electrical resistance or an acceptable range of resistances in the bake and broil elements of the smart oven, an amount of electrical current supplied to the smart oven when the smart oven is turned on, a voltage waveform indicating the amount of voltage supplied to the bake and broil elements of the oven according to the set temperature and the amount of time that the oven has been turned on, an average rate or range of average rates of gas flowing to the smart oven when the smart oven is turned on, etc.

In some embodiments, the smart home controller may receive sensor data from two or more different types of home equipment to determine that a failure in a piece of home equipment has occurred. Referring to the example above, the smart home controller may receive a first set of sensor data from the smart oven 110*b*, as described above. The smart home controller may also receive a second set of sensor data from the smart electrical outlet 110*f* from which the smart oven receives power (e.g., the second set of sensor data may include the amount of current flowing from the electrical outlet) to determine whether the failure is due to a failure in the smart oven 110*b* or the smart electrical outlet 110*f*. If the smart home controller determines that the failure is due to a failure in the smart oven 110*b* (e.g., the smart oven 110*b* is receiving the appropriate amount of power from the electrical outlet), the smart oven 110*b* may need to be repaired. However, if the failure is due to a failure in the smart electrical outlet 110*f*, the smart home controller may compare the second set of sensor data to a set of equipment conditions corresponding to an electrical outlet, may determine whether any of the electrical outlets are receiving power to detect a power failure, may determine whether any of the circuit breakers have been tripped, or may take any other suitable course of action.

Additionally, the smart home controller may collect diagnostic information for the piece of home equipment based on the comparison of the sensor data to the set of equipment conditions. The diagnostic information may include identification information for the piece of home equipment, an indication of the failure which has occurred, sensor data for the piece of home equipment, data indicative of normal operating characteristics for the piece of home equipment, a message explaining the variation between the sensor data and the data indicative of normal operating characteristics given the status of the piece of home equipment (e.g., oven temperature is 200 degrees 20 minutes after setting the oven temperature to 400 degrees), an indication of the likely cause of the failure, such as images/video of the piece of home equipment and/or including one or more parts within the piece of home equipment which may have failed and may need to be replaced, identification information for one or more replacement parts corresponding to the parts which may need to be replaced, etc.

For example, diagnostic information for the smart oven 110*b* may include: (i) the make and model of the oven; (ii) an indication that the oven is not heating properly; (iii) sensor data for the oven, such as the current temperature of the oven, the temperature setting for the oven, the amount of electrical current supplied to the oven, the resistance in the bake and broil elements, images of the bake and broil elements, the gas flow supplied to the oven, etc.; (iv) data indicative of a normal oven temperature and a threshold temperature variance, a normal resistance in the bake and broil elements and a threshold resistance variance, a normal gas flow and a threshold gas flow variance, etc.; (v) an indication that the bake element likely failed and needs to be replaced; and (vi) the make and model of a replacement bake element for the oven.

In this manner, the smart home controller may send the diagnostic information to the repair service provider when scheduling a repair. The repair service provider may then verify that the repair is necessary based on the diagnostic information, and may determine which parts need to be repaired or replaced based on the diagnostic information. Consequently, the repair service provider may obtain replacement parts identified in the diagnostic information and may bring the proper devices/tools for performing the repair so that the repair may be performed in one trip to the property owner's property.

In any event, if the smart home controller analyzes the received sensor data and determines that a failure in the piece of home equipment has not occurred, the smart home controller may continue to receive sensor data from the piece of home equipment (reference 302).

On the other hand, if the smart home controller determines that a failure has occurred, a notification may be transmitted to a repair service provider to pre-schedule a repair (reference 308). The notification may be an email, a short message service (SMS) text message, a phone call, a push notification, or any other suitable notification. The smart home controller may select a repair service provider from several repair service providers. In some embodiments, the property owner may pre-authorize some repair service providers to perform repairs, and the smart home controller 120 may select a repair service provider from a network of pre-authorized repair service providers. For example, as mentioned above the smart home controller may obtain contact information for several pre-authorized repair service providers from one of the databases 122, 239. The databases 122, 239 may also store indications of the type of home equipment that each repair service provider can repair, and as a result, the smart home controller may select a repair service provider capable of repairing the type of home equipment which experienced the failure.

For example, the property owner may have pre-authorized Johnny's Repair Shop which may repair plumbing fixtures, whereas Fred's Quick Fixes, also pre-authorized by the property owner, may repair electrical equipment. Therefore, if the smart bathtub 110*a* is experiencing a failure, the smart home controller may select Johnny's Repair Shop for performing the repair. Moreover, the repair service providers for a particular type of home equipment may be ranked according to several characteristics such as proximity, quality of service, cost, customer satisfaction ratings, availability, etc. Each of these characteristics may be obtained from other smart home controllers, from online reviews, may be learned based on previous selections, etc. In some embodiments, the smart home controller may select the top ranked pre-authorized repair service provider for the type of home equipment which experienced the failure. In other embodiments, the smart home controller may select the pre-authorized repair service provider according to user settings, or based on previous selections. For example, for each type of home equipment, the user may select a preferred repair service provider and/or may provide a list of repair service providers to the smart home controller to select from based on the above mentioned characteristics. In other embodiments, the property owner may pre-authorize all repair service providers to perform home equipment repairs and may not specify any particular repair service providers.

In some embodiments, a repair service provider may be selected based on whether the repair service provider has the replacement parts in stock identified by the diagnostic information. For example, the smart home controller may obtain indications of replacement parts which a repair service provider has in stock for example, from a repair service provider server. If one of the replacement parts is of the same make and model as the make and model of a replacement part included in the diagnostic information, the repair service provider may be selected.

In any event, once a repair service provider is selected, the notification may include diagnostic information. The diagnostic information may include identification information for the piece of home equipment experiencing the failure, such as the make and model of the piece of home equipment; an indication of a likely cause of the failure, such as images/video of the piece of home equipment; and/or a message explaining the variation between the operating conditions of the piece of home equipment and normal operating characteristics given the status of the piece of home equipment (e.g., oven temperature is 200 degrees 20 minutes after setting the oven temperature to 400 degrees). In this manner, the repair service provider may receive an indication of the likely cause of the failure so that the repair service provider may bring the proper devices/tools (e.g., replacement parts) to fix the piece of home equipment, without first having to inspect the piece of home equipment. Thus, the repair may be completed in a single trip, saving the repair service provider from having to make several trips to the property.

The notification may also include the location of the property which includes the piece of home equipment and a request for the repair service provider to indicate a pre-scheduled time for performing the repair. In some embodiments, the notification may indicate one or more preferred dates, times, and/or time slots for the repair service provider to perform the repair, such as weekdays between 9 a.m. and 5 p.m. or Saturdays in April after 2 p.m. Furthermore, the notification may include authorization for the repair service provider to access the property and access information for accessing the property, such as an indication that a key to the front door will be under the door step, a security code for entering the garage or for entering through the front door, an alarm code for disabling a security alarm, etc. In some embodiments, the access information may be transmitted after the repair service provider agrees to perform the repair and/or the access information may be transmitted in an encrypted manner, such that the access information is password-protected. The repair service provider may have to enter login information to view the access information. An example notification is described in more detail below with reference to FIG. 4.

In some embodiments, the smart home controller 120 may also transmit a property owner notification to one of the client devices 130-134 of the property owner indicating that a failure has occurred and the repair process is being initiated. The property owner notification may be an email, an SMS text message, a phone call, a push notification, or any other suitable notification. The property owner notification may include identification information for the piece of home equipment experiencing the failure, an indication of the failure, and an indication that the repair process is being initiated.

In any event, in response to receiving the notification, the repair service provider may transmit a scheduled time for performing the repair (e.g., Tuesday, May 6 at 2:30 p.m.), and an indication of a cost for performing the repair (reference 310). If the cost for performing the repair is less than or equal to the pre-authorized payment amount, the smart home controller may transmit pre-payment for the repair (reference 312), for example by transferring payment via the property owner's Venmo® account, Google Wallet™ account, Paypal™ account, Apple Pay™ account, etc. In some embodiments, the smart home controller may transmit the full cost of the repair as pre-payment, may transmit half the cost of the repair as pre-payment and may transmit the second half after the repair is performed, or may transmit pre-payment and payment in any suitable manner. If the cost for performing the repair exceeds the pre-authorized payment amount, the smart home controller may transmit a request to one of the client devices 130-134 for the property owner to authorize payment at the additional cost. The property owner may then transmit authorization to the smart home controller to increase the pre-authorized payment amount to the amount corresponding to the received cost, and as a result, the smart home controller may transmit a pre-payment to the repair service provider. In other embodiments, if the repair service provider charges more than the pre-authorized payment amount, the smart home controller may transmit another notification to the repair service provider not to perform the repair, and may select a different repair service provider.

Figure 4:
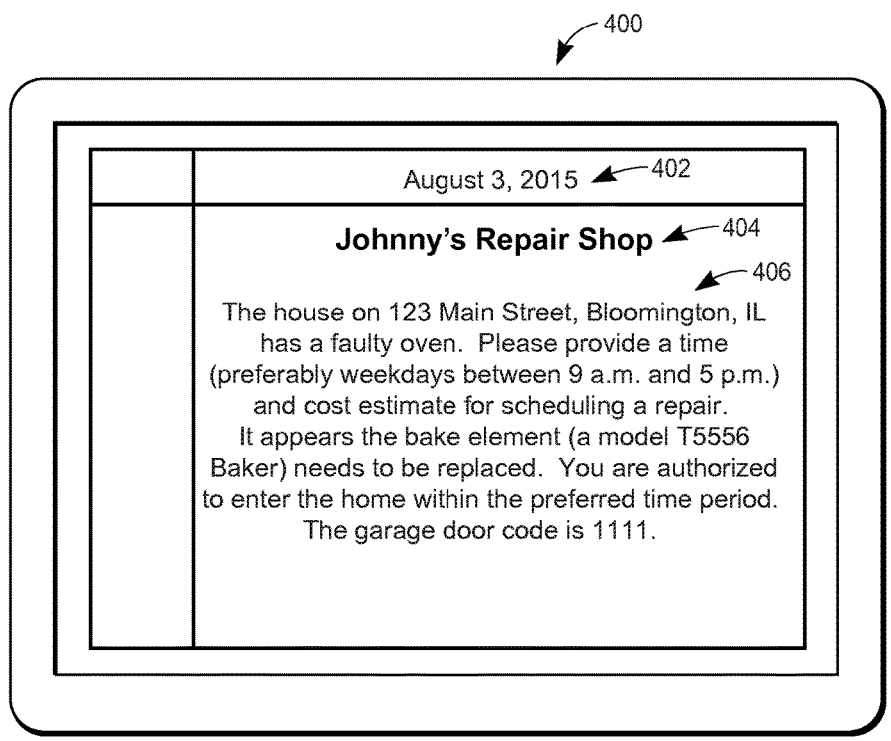
FIG. 4 depicts a block diagram detailing an exemplary repair scheduling notification in accordance with the presently described embodiments.

In some embodiments, to communicate with the smart home controller 120, a repair service provider and/or a repair technician may execute a client application on a repair service provider client device which may be a mobile device, a tablet, a laptop, a desktop, a smart watch, smart glasses, phablet, smart contact lenses, wearable electronics, pager, personal digital assistant, computing device configured for wireless communication, or any other electronic device. The repair service provider client device may be similar to the client devices 130-134 as described above in FIGS. 1 and 2. Also, the repair service provider client device may communicate directly with the repair service provider server 140 as shown in FIG. 1, which may receive and transmit notifications to/from the smart home controller 120. Using the client application, the repair service provider client device may display notifications transmitted by the smart home controller 120. For example, the client application may display emails, SMS messages, application pages, etc. FIG. 4 depicts a client application page and/or screen that the smart home controller 120 may transmit in various embodiments of the repair pre-scheduling system. However, the screen depicted in FIG. 4 is merely an illustration of an exemplary embodiment. In some embodiments, in addition or as an alternative to displaying the client application screen on the repair service provider client device, the client application screen may be displayed via a user interface on the repair service provider server 140.

In any event, the repair service provider may launch the client application from the repair service provider client device via any suitable manner, such as touch-selecting a client application icon on the display, or double-clicking on the client application icon via a mouse and/or a trackpad. In some embodiments, the client application may launch automatically upon receiving a notification from the smart home controller 120.

FIG. 4 depicts an exemplary repair scheduling notification 400 which may be generated by the smart home controller 120 and displayed by the client application of the repair service provider client device, and/or displayed on a user interface of the repair service provider server. As will be appreciated by those of ordinary skill in the relevant art(s), the exemplary display shown in FIG. 4 is for illustrative purposes, and the associated functionality may be implemented using any suitable format and/or design for facilitating corresponding described functionalities without departing from the spirit and scope of the present disclosure.

The repair scheduling notification 400 may include an indication of the date 402 in which the notification is transmitted, an indication of the repair service provider receiving the notification 404, and a notification message 406. The notification message 406 may include the location of the property which includes the piece of home equipment "123 Main Street, Bloomington, Ill." Moreover, the notification message 406 may include identification of the piece of home equipment experiencing the failure "a faulty oven," an indication of a likely cause of the failure, "It appears the bake element (a model T5556 Baker) needs to be replaced," and identification information for a replacement part, "a model T5556 Baker." In some embodiments, the notification message 406 may also include additional diagnostic information for the faulty oven, such as the make and model of the oven, sensor data for the oven, data indicative of normal operating characteristics for the oven, a message explaining the variation between the sensor data and the normal operating characteristics for the oven, etc.

Furthermore, the notification message 406 may include a request for the repair service provider to provide a pre-scheduled time and cost estimate for scheduling the home equipment repair. A preferred time slot, "preferably weekdays between 9 a.m. and 5 p.m.," may also be included.

In addition to providing a location, diagnostic information, and a request for a pre-scheduled time and cost estimate, the notification message 406 may include authorization for the repair service provider to access the property such as, "You are authorized to enter the home within the preferred time period," and access information for accessing the property such as, "The garage door code is 1111." In some embodiments, the access information may be transmitted in a separate notification message after the repair service provider agrees to perform the repair. Also in some embodiments, the access information may be transmitted in an encrypted manner, such that the access information is password-protected. For example, the repair service provider may have to enter login information to view the notification message 406. In another example, the notification message 406 may request the repair service provider to login to a separate application page and/or screen to view the access information via a link included in the notification message 406. By clicking on the link, the repair service provider may be prompted to enter login information and when the login information is authenticated for example, by the smart home controller 120, the separate application page and/or screen may be displayed with the access information such as, "The garage door code is 1111."

In an exemplary scenario, John Doe may have a faulty dishwasher in his home. His smart home controller may receive sensor data from the dishwasher, such as an electrical waveform of the dishwasher motor, resistance data for the dishwasher motor, temperature data in the dishwasher, water flow data in the drain hose of the dishwasher, etc. The sensor data may be compared to a set of equipment conditions for a dishwasher (e.g., a resistance in the dishwasher motor of 2500 ohms with a threshold variance of 1000 ohms). The smart home controller may determine that the sensor data for the dishwasher differs from normal operating characteristics by more than the threshold variance (e.g., the resistance in the dishwasher motor is 1000 ohms) given the current state of the dishwasher (e.g., the dishwasher is in the 'ON' position) and external factors (e.g., the electrical outlet which the dishwasher is plugged into is receiving an appropriate amount of power).

As a result, the smart home controller may identify contact information for Archie's Dishwasher Repairs (which John pre-authorized to perform home equipment repairs) and send a notification to Archie's for pre-scheduling a dishwasher repair of a dishwasher with a faulty motor at John's home, similar to the repair scheduling notification 400. In turn, Archie's may transmit a response notification indicating a scheduled time of 10 a.m. for the upcoming Wednesday, and a cost of $500. If John Doe pre-authorized payments up to $1000, the smart home controller 120 may transmit a pre-payment of $500 to Archie's Dishwasher Repairs via John's PayPal™ account. Consequently, Archie's may send a repair technician with the proper equipment for fixing the dishwasher to John Doe's home at the scheduled time. In this manner, a home equipment failure may be detected and repaired in a fast, accurate, and efficient process without involving the property owner.

Figure 5:
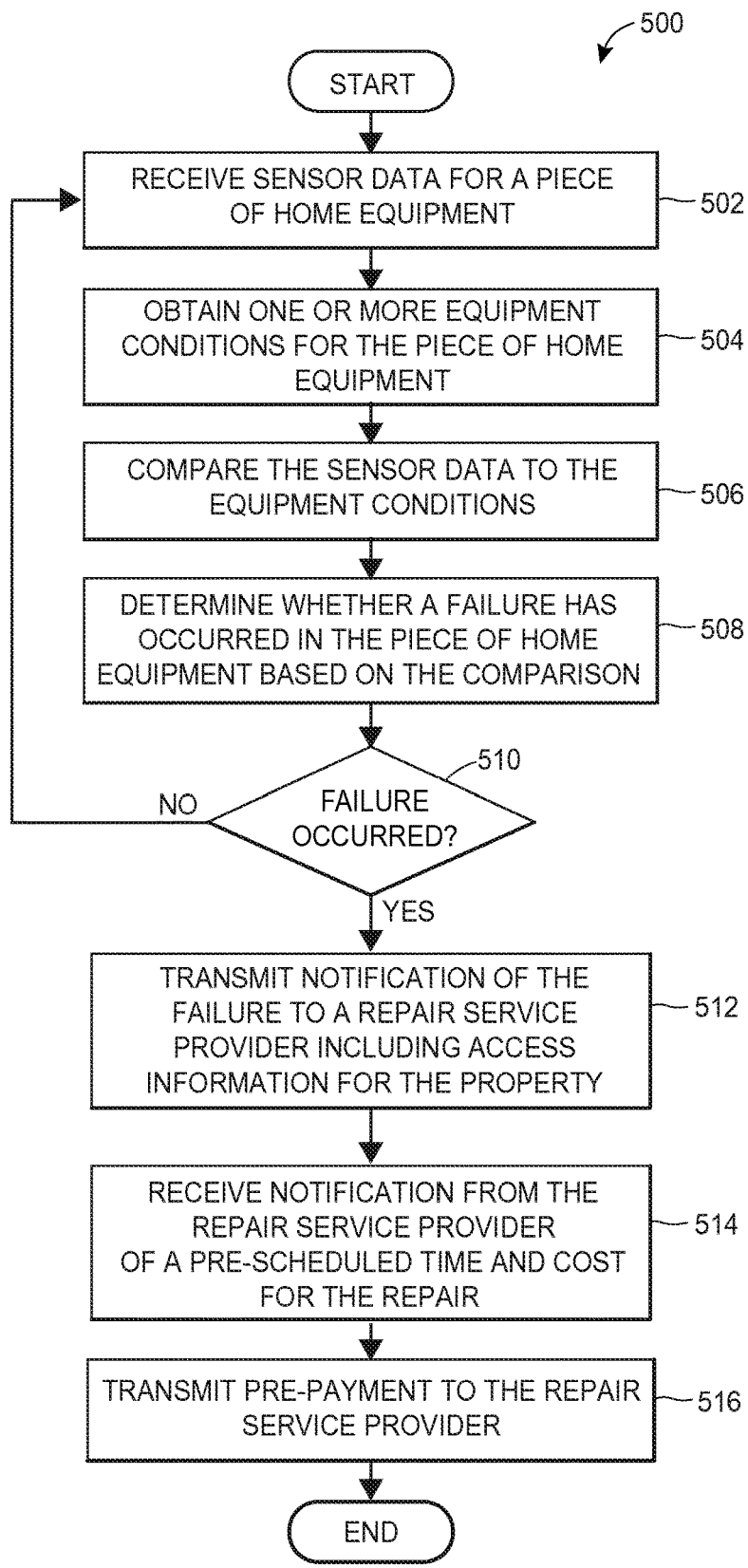
FIG. 5 depicts a flow diagram representing an exemplary method for pre-scheduling repair of home equipment in accordance with the presently described embodiments.

FIG. 5 depicts a flow diagram representing an exemplary method 500 for pre-scheduling repair of home equipment. The method may be executed on the smart home controller 120. In some embodiments, the method 500 may be implemented in a set of instructions stored on a non-transitory computer-readable memory and executable on one or more processors of the smart home controller 120.

At block 502, sensor data may be received for a piece of home equipment. The piece of home equipment may be a smart device such as one of the smart devices 110a-110f as shown in FIG. 1. Furthermore, the piece of home equipment may be any of various smart appliances (e.g., clothes washer, dryer, dish washer, refrigerator, etc.), smart heating devices (e.g., furnace, space heaters, etc.), smart cooling devices (e.g., air conditioning units, fans, ceiling fans, etc.), smart plumbing fixtures (e.g., toilets, showers, water heaters, piping, interior and yard sprinklers, etc.), smart cooking devices (e.g., stoves, ovens, grills, microwaves, etc.), smart wiring, lighting, and lamps, smart thermostats, smart windows, doors, or garage doors, smart window blinds or shutters, and/or other smart devices and/or sensors capable of wireless or wired communication. In some embodiments, the smart home controller 120 may receive sensor data from several pieces of home equipment at or around the same time.

The sensor data may include electrical data such as current data, voltage data, resistance data, voltage waveforms, electrical signatures, etc. Additionally, the sensor data may include fluid flow data, gas flow data, visual data depicting the piece of home equipment, audio data, data regarding the status of any characteristic of the operation of the piece of home equipment, temperature data, position data, liquid level data, pressure data, etc.

The smart home controller 120 may obtain a set of equipment conditions for the same type of home equipment as the piece of home equipment, which when satisfied, may be indicative of a failure of the piece of home equipment (block 504). The equipment conditions may include normal operating characteristics given the status of the piece of home equipment as well as a threshold variance. Furthermore, an equipment condition may be satisfied when the sensor data differs from at least some of the data included in the equipment condition.

For example, if the type of home equipment is a sump pump, one equipment condition may include a normal operating characteristic requiring that an electrical waveform for the motor matches a reference waveform indicative of normal operation, and a threshold variance for the electrical waveform, such as a threshold variation in amplitude for certain frequency components of the waveform. Another equipment condition may include a fluid level in a sump pump basin which is indicative of a normal fluid level, such as below the top of the sump pump basin. The equipment condition may also include a threshold variance in the fluid level, such as 0.5 inches, one inch, two inches, etc., so that a failure is identified when the detected fluid level is higher than the threshold variance (0.5 inches, one inch, two inches, etc.) above the top of the sump pump basin. In some embodiments, the equipment condition may also include a second threshold variance as a threshold period of time (e.g. 30 seconds, one minute, ten minutes, etc.), such that the detected fluid level may be higher than the threshold variance for the threshold period of time before a failure is identified. In this manner, the smart home controller 120 may not determine that a sump pump which slowly pumps out water is in need of repair.

In other embodiments, the smart home controller 120 may compare the fluid level in the sump pump basin, as detected by fluid level sensors, to the normal fluid level (e.g., below the top of the sump pump basin). If the detected fluid level exceeds the normal fluid level, the smart home controller 120 may determine that the sump pump may need to be repaired.

In another example, if the type of home equipment is an HVAC unit, one equipment condition may include a normal operating characteristic requiring that the temperature in the room matches the temperature on the thermostat set by the user. For example, if the user sets the temperature to 72 degrees, the normal operating temperature may be 72 degrees. Additionally, the equipment condition may include a first threshold variance as a threshold period of time for reaching the temperature set on the thermostat (e.g., five minutes, ten minutes, thirty minutes, etc.) after the temperature has been set. In some embodiments, the threshold period of time may vary depending on the difference between the initial temperature in the room when the user sets the thermostat and the desired temperature according to the user's setting. Moreover, the equipment condition may include a second threshold variance in the temperature, such as one degree, two degrees, five degrees, etc. In this manner, a failure may be identified if the temperature in the room is not within the threshold variance of the temperature set by the user, within the threshold period of time.

The received sensor data may then be compared to the set of equipment conditions (block 506) to determine whether a failure has occurred in the piece of home equipment (block 508). If one or more of the set of equipment conditions is satisfied, the smart home controller may determine that a failure has occurred in the piece of home equipment. For example, if according to one or more of the set of equipment conditions, the sensor data for the piece of home equipment differs from the normal operating characteristics by more than the threshold variance, the smart home controller 120 may determine that a failure has occurred. Using the example above, if the type of home equipment is an HVAC unit, a normal operating characteristic is that the temperature in the room matches the temperature on the thermostat set by the user, a first threshold variance is five minutes after the temperature has been set, and a second threshold variance is two degrees, then the smart home controller 120 may determine that a failure has occurred if the room temperature is greater than 74 degrees or less than 70 degrees more than five minutes after the temperature has been set by the user.

If the smart home controller 120 does not determine that a failure has occurred, the method may return to block 502, and the smart home controller 120 may continue to receive sensor data. On the other hand, if the smart home controller 120 determines that a failure has occurred, a notification may be transmitted to a repair service provider server and/or a repair service provider client device (block 512). The notification may be an email, an SMS text message, a phone call, a push notification, or any other suitable notification. In some embodiments, the smart home controller 120 may select a repair service provider from several repair service providers. In some embodiments, the property owner may pre-authorize some repair service providers to perform repairs, and the smart home controller 120 may select a repair service provider from a network of pre-authorized repair service providers.

For example, the property owner may have pre-authorized Repair Shop A to repair kitchen appliances, whereas Repair Shop B, also pre-authorized by the property owner, may repair laundry room equipment. Therefore, if the smart oven 110*b* is experiencing a failure, the smart home controller may select Repair Shop A for performing the repair. Moreover, the repair service providers for a particular type of home equipment may be ranked according to several characteristics such as proximity, quality of service, cost, customer satisfaction ratings, availability, etc. In other embodiments, the property owner may pre-authorize all repair service provider to perform home equipment repairs and may not specify any particular repair service providers.

In any event, the notification may include diagnostic information. The diagnostic information may include identification information for the piece of home equipment experiencing the failure, such as the make and model of the piece of home equipment; an indication of a likely cause of the failure, such as images/video of the piece of home equipment; and/or a message explaining the variance between the operating conditions of the piece of home equipment and normal operating characteristics given the status of the piece of home equipment (e.g., the water flow rate in the washing machine is more than the threshold variance below the normal operating water flow rate several minutes after turning the washing machine on).

The notification may also include the location of the property which includes the piece of home equipment and a request for the repair service provider to indicate an available time for performing the repair. In some embodiments, the notification may indicate one or more preferred dates, times, and/or time slots for the repair service provider to perform the repair. Furthermore, the notification may include authorization for the repair service provider to access the property and access information for accessing the property, such as an indication that a key to the front door will be under the door step, a security code for entering the garage or for entering through the front door, an alarm code for disabling a security alarm, etc.

At block 514, the smart home controller 120 may receive a response notification from the repair service provider server and/or a repair service provider client device which may include a pre-scheduled time and a cost for performing the repair. If the cost for performing the repair does not exceed the maximum payment amount pre-authorized by the property owner, the smart home controller 120 may transmit pre-payment for the cost of the repair to the repair service provider (block 516). On the other hand, if the cost for performing the repair is greater than the pre-authorized payment amount, the smart home controller 120 may transmit another notification to the repair service provider instructing the repair service provider not to perform the repair, or may transmit a request to the property owner to authorize payment for the cost of the repair.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives.

For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A computer-implemented method for automatically scheduling repair of smart home equipment, the method executed by one or more processors programmed to perform the method, the method comprising:
   receiving, at a smart home controller, an indication from a property owner pre-authorizing automatic scheduling of smart home equipment repairs;
   for each of a plurality of pieces of smart home equipment located at a property which includes a smart home system:
      periodically collecting, at one or more first sensors communicatively coupled to a first piece of smart home equipment, a first set of sensor data for the first piece of smart home equipment;
      periodically collecting, at one or more second sensors communicatively coupled to a second piece of smart home equipment which is physically connected to the first piece of smart home equipment, a second set of sensor data for the second piece of home equipment;
   receiving, at the smart home controller, the first set of sensor data for the first piece of smart home equipment from the one or more first sensors and the second set of sensor data for the second piece of smart home equipment from the one or more second sensors;
   identifying, by the smart home controller, a failure at the first piece of smart home equipment;
   in response to identifying the failure at the first piece of smart home equipment, determining, by the smart home controller, that the first piece of smart home equipment needs to be repaired based on a collective analysis of both the first and second sets of sensor data for the first and second pieces of smart home equipment, respectively, wherein the collective analysis is used to identify whether the first or the second piece of smart home equipment is a cause of the failure, the collective analysis including:
      analyzing, by the smart home controller, the first and second sets of sensor data to detect that the first piece of smart home equipment is operating outside of normal operating characteristics for the first piece of smart home equipment and that the second piece of smart home equipment is operating within normal operating characteristics for the second piece of smart home equipment;
   when the first piece of smart home equipment needs to be repaired:
      automatically and without interacting with the property owner, scheduling, by the smart home controller, a repair of the first piece of smart home equipment including:
         transmitting, by the smart home controller, a first notification to a repair service provider for scheduling the repair of the first piece of smart home equipment, wherein the first notification includes an authorization to access the property and access information for accessing the property; and
         receiving, by the smart home controller, a second notification from the repair service provider including a scheduled time for repairing the first piece of smart home equipment to cause the first piece of smart home equipment to be repaired; and
      providing, by the smart home controller, a control signal to the first piece of smart home equipment to shut down or limit operation of the first piece of smart home equipment in response to the failure.

2. The method of claim 1, wherein the second notification from the repair service provider includes a cost for performing the repair, and further comprising: obtaining, at the smart home controller, a pre-authorized payment amount from a property owner.

3. The method of claim 2, wherein when the received cost for performing the repair does not exceed the pre-authorized payment amount, the method further comprises transmitting, by the smart home controller, a pre-payment for performing the repair at the scheduled time.

4. The method of claim 2, wherein when the received cost for performing the repair exceeds the pre-authorized payment amount, the method further comprises transmitting, by the smart home controller, a third notification to the repair service provider not to perform the repair at the scheduled time.

5. The method of claim 2, wherein when the received cost for performing the repair exceeds the pre-authorized payment amount, the method further comprises:
   transmitting, by the smart home controller, a request to the property owner to increase the pre-authorized payment amount to an amount corresponding to the received cost;
   receiving, by the smart home controller, an authorization from the property owner to increase the pre-authorized payment amount to the amount corresponding to the received cost; and
   transmitting, by the smart home controller, a pre-payment for performing the repair at the scheduled time.

6. The method of claim 1, wherein the first notification includes preferred times or preferred time ranges for scheduling the repair and wherein the preferred times or preferred time ranges are when the property owner will be away from the property.

7. The method of claim 1, further comprising:
analyzing, by the smart home controller, the received first set of sensor data to identify diagnostic information for the first piece of smart home equipment; and
wherein the first notification includes the identified diagnostic information.

8. The method of claim 1, wherein the information for accessing the property includes at least one of: a security code for entering the property, location information for retrieving a key to the property, or an alarm code for disabling an alarm located on the property.

9. The method of claim 1, wherein determining that the first piece of smart home equipment needs to be repaired includes:
obtaining, by the smart home controller, one or more equipment conditions for determining whether the first piece of smart home equipment needs to be repaired based on a type of equipment for the first piece of smart home equipment;
comparing, by the smart home controller, the first set of sensor data to the one or more equipment conditions corresponding to the matching type of home equipment; and
determining, by the smart home controller, that the first piece of smart home equipment needs to be repaired based on the comparison.

10. The method of claim 1, wherein the plurality of pieces of smart home equipment include at least one of: a refrigerator, a freezer, a dish washer, a washing machine, a dryer, an oven, a stove, a microwave, a heating, ventilating and air conditioning (HVAC) unit, a furnace, a sump pump, a plumbing fixture, or an electrical outlet.

11. A system for automatically scheduling repair of smart home equipment within a smart home, the system comprising:
one or more sensors communicatively coupled to a plurality of pieces of smart home equipment located at a property which includes a smart home system, wherein the one or more sensors collect sensor data for the plurality of pieces of smart home equipment; and
a smart home controller including:
one or more processors;
a communication network; and
a non-transitory computer-readable memory coupled to the one or more processors, the one or more sensors, and the communication network, and storing thereon instructions that, when executed by the one or more processors, cause the smart home controller to:
receive an indication from a property owner pre-authorizing automatic scheduling of smart home equipment repairs;
for each of the plurality of pieces of smart home equipment:
periodically receive a first set of sensor data for a first piece of smart home equipment generated by at least one of the one or more sensors which are communicatively coupled to the first piece of smart home equipment;
periodically receive a second set of sensor data for a second piece of smart home equipment which is physically connected to the first piece of smart home equipment, wherein the second set of sensor data is generated by at least one of the one or more sensors which are communicatively coupled to the second piece of smart home equipment;
identify a failure at the first piece of smart home equipment;
in response to identifying the failure at the first piece of smart home equipment, determine that the first piece of smart home equipment needs to be repaired based on a collective analysis of both the first and second sets of sensor data for the first and second pieces of smart home equipment, respectively, wherein the collective analysis is used to identify whether the first or the second piece of smart home equipment is a cause of the failure, the collective analysis including:
analyze the first and second sets of sensor data to detect that the first piece of smart home equipment is operating outside of normal operating characteristics for the first piece of smart home equipment and that the second piece of smart home equipment is operating within normal operating characteristics for the second piece of smart home equipment;
when the first piece of smart home equipment needs to be repaired:
automatically and without interacting with the property owner, schedule a repair of the first piece of smart home equipment including:
transmit, via the communication network, a first notification to a repair service provider for scheduling the repair of the first piece of smart home equipment, wherein the first notification includes an authorization to access the property and access information for accessing the property; and
receive, via the communication network, a second notification from the repair service provider including a scheduled time for repairing the first piece of smart home equipment to cause the first piece of smart home equipment to be repaired; and
provide a control signal to the first piece of smart home equipment to shut down or limit operation of the first piece of smart home equipment in response to the failure.

12. The system of claim 11, wherein the second notification from the repair service provider includes a cost for performing the repair, and wherein the instructions further cause the smart home controller to obtain a pre-authorized payment amount from a property owner.

13. The system of claim 12, wherein when the received cost for performing the repair does not exceed the pre-authorized payment amount, the instructions further cause the smart home controller to transmit, via the communication network, a pre-payment for performing the repair at the scheduled time.

14. The system of claim 12, wherein when the received cost for performing the repair exceeds the pre-authorized payment amount, the instructions further cause the smart home controller to transmit, via the communication network, a third notification to the repair service provider not to perform the repair at the scheduled time.

15. The system of claim 12, wherein when the received cost for performing the repair exceeds the pre-authorized payment amount, the instructions further cause the smart home controller to:

transmit, via the communication network, a request to the property owner to increase the pre-authorized payment amount to an amount corresponding to the received cost;

receive, via the communication network, an authorization from the property owner to increase the pre-authorized payment amount to the amount corresponding to the received cost; and transmit, via the communication network, a pre-payment for performing the repair at the scheduled time.

16. The system of claim 11, wherein the first notification includes preferred times or preferred time ranges for scheduling the repair and wherein the preferred times or preferred time ranges are when the property owner will be away from the property.

17. The system of claim 11, wherein the instructions further cause the smart home controller to:

analyze the received first set of sensor data to identify diagnostic information for the first piece of smart home equipment; and wherein the first notification includes the identified diagnostic information.

18. The system of claim 17, wherein the information for accessing the property includes at least one of: a security code for entering the property, location information for retrieving a key to the property, or an alarm code for disabling an alarm located on the property.

19. The system of claim 11, wherein to determine that the first piece of smart home equipment needs to be repaired, the instructions cause the smart home controller to:

obtain one or more equipment conditions for determining whether the first piece of smart home equipment needs to be repaired based on a type of equipment for the first piece of smart home equipment;

compare the first set of sensor data to the one or more equipment conditions corresponding to the matching type of home equipment; and determine that the first piece of smart home equipment needs to be repaired based on the comparison.

20. The system of claim 11, wherein the plurality of pieces of smart home equipment include at least one of: a refrigerator, a freezer, a dish washer, a washing machine, a dryer, an oven, a stove, a microwave, a heating, ventilating and air conditioning (HVAC) unit, a furnace, a sump pump, a plumbing fixture, or an electrical outlet.

\* \* \* \* \*